United States Patent [19]

Aimura

[11] Patent Number: 4,569,047
[45] Date of Patent: Feb. 4, 1986

[54] SIGNAL TRANSMISSION SYSTEM
[75] Inventor: Harutsugu Aimura, Tokyo, Japan
[73] Assignee: Canon Kabushiki Kaisha, Tokyo, Japan
[21] Appl. No.: 551,493
[22] Filed: Nov. 14, 1983

Related U.S. Application Data

[63] Continuation of Ser. No. 290,291, Aug. 5, 1981, abandoned.

[30] Foreign Application Priority Data

Aug. 12, 1980 [JP] Japan .................................. 55-109844

[51] Int. Cl.⁴ ............................................. H04J 3/08
[52] U.S. Cl. ........................................ 370/85; 370/67; 340/825.08
[58] Field of Search ................ 370/66, 67, 85, 62, 370/110.4, 86, 88; 340/825.07, 825.08

[56] References Cited

U.S. PATENT DOCUMENTS

| | | | |
|---|---|---|---|
| 3,303,470 | 2/1967 | Brixner et al. | 340/825.08 |
| 4,052,566 | 10/1977 | MacKay | 370/85 |
| 4,052,567 | 10/1977 | MacKay | 370/85 |
| 4,053,714 | 10/1977 | Long | 370/85 |
| 4,140,877 | 2/1979 | Joslow et al. | 370/67 |
| 4,156,112 | 5/1979 | Moreland | 370/85 |
| 4,289,932 | 9/1981 | Neid | 370/62 |
| 4,301,532 | 11/1981 | Janetzky | 370/85 |
| 4,340,961 | 7/1982 | Capel et al. | 370/85 |
| 4,347,602 | 8/1982 | Kister et al. | 370/85 |
| 4,360,910 | 11/1982 | Segal et al. | 370/62 |

Primary Examiner—Gerald L. Brigance
Attorney, Agent, or Firm—Fitzpatrick, Cella, Harper & Scinto

[57] ABSTRACT

A signal transmission system for interconnecting a plural number of input/output devices comprises a pair of signal lines for transmitting signals between the input/output devices and a reference signal generator connected to the signal lines for generating a reference signal for using the signal lines on a time-division basis in order for each of the input/output devices to perform signal transmission during an allotted time. A reference signal detector detects the reference signal transmitted from the reference signal generator by the signal lines. A signal line using time selector selects the using time of the signal lines allotted to each of the input/output devices on the basis of the reference signal as detected by the detector and a further selector is responsive to the using time selected by the using time selector for selecting a signal transmitted by the signal lines from each of the input/output devices to others of the input/output devices and a signal to be transmitted to each of the input/output devices from others of the input/output devices.

5 Claims, 8 Drawing Figures

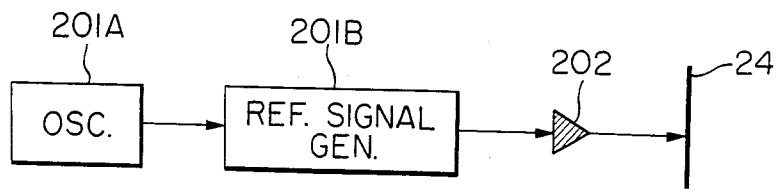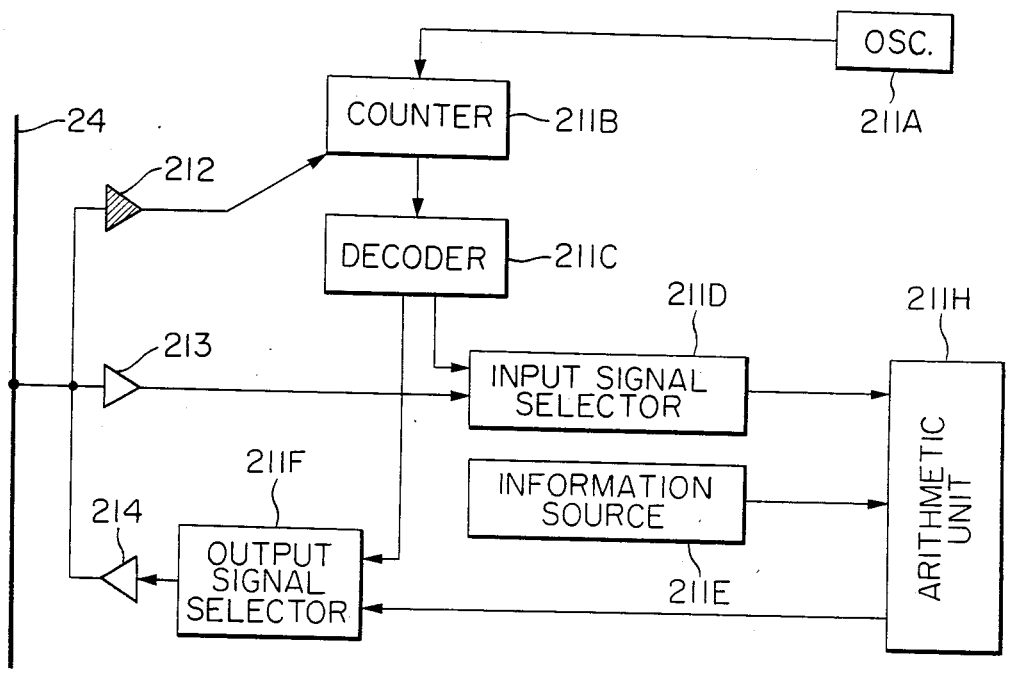

SIGNAL TRANSMISSION SYSTEM

This application is a continuation of application Ser. No. 290,291 filed Aug. 5, 1981, now abandoned.

BACKGROUND OF THE INVENTION

1. Field of the Invention

This invention relates to a system for transmitting signals between a plural number of input/output devices, or more particularly, to a signal transmission system which is improved to reduce drastically the number of signal lines connecting input/output devices.

2. Description of the Prior Art

Generally, known signal transmission systems transmit signals between a plural number of input/output devices by connecting each input/output device to every other input/output device with a separate signal line. Additionally, signal transmission systems are known in which identifying signals which direct the destination of input/output signals are transmitted simultaneously with the input/output signals. That is, the destination of each input/output signal is decided by distributing both the input/output signal and identifying signal to other input/output devices.

However since both these conventional signal transmission systems have required for example, two times as many signal lines as the number of the input/output devices, they have the disadvantage, that the wiring between input/output devices is complex. The configuration of the signal lines as well as the entire signal transmission system becomes cumbersome and the the reliability of signal transmission is reduced.

FIG. 1 shows an example of a signal transmission system of conventional type. The exemplary configuration illustrated shows the case in which signal transmission is made between the devices I, II, and III. In FIG. 1, 11, 12, and 13 show respectively the devices I, II, and III, 111, 121, and 131 are arithmetic units forming a part respectively of the devices I, II, and III, and 112, 113; 122, 123;, 132, 133; 114, 115; 124, 125; and 134, 135 are driving sections and receiving sections for input/output signals respectively going from the arithmetic units of each device to other devices or coming from other devices to the arithmetic units of each device. 14 is a plural number of pairs of signal lines which individually connect each of these driving sections with each of these receiving sections, in which a, b, c, d, e, and f show respectively a pair of signal lines. For example, the signal line a is a pair of signal lines used for signal starting from the arithmetic unit 111 of the device I, passing through the driving section 112 and receiving section 124 sequentially, and arriving at the arithmetic unit 121 of the device II. Accordingly the signal lines used in the illustrated configuration comprise 6 pairs a through f two times as many in number as the number of devices namely 3. As has been described so far in the conventional signal transmission system, the configuration of signal lines connecting the devices to one another is very complicated.

SUMMARY OF THE INVENTION

An object of this invention is to provide a signal transmission system capable of simplifying signal transmission between a plural number of input/output devices.

Another object of this invention is to provide a signal transmission system capable of simplifying the wiring between a plural number of input/output devices.

Another object of this invention is to provide a signal transmission system capable of miniaturizing drastically the overall configuration of a signal transmission system.

Another object of this invention is to provide a signal transmission system in which the input/output signal lines coming from a plural number of input/output devices and the reference signal line from a reference signal source are connected to a pair of signal lines, and based on the reference signal sent from said reference signal source and by using a pair of signal lines on a time division basis, the signal transmission between the plural number of input/output devices is made by way of said pair of signal lines.

BRIEF DESCRIPTION OF THE DRAWINGS

FIGS. 2A, 2B, and 2C are block diagrams showing respectively the overall configuration of signal transmission systems of the present invention, the detailed configuration of the reference signal sources thereof, and an example of the detailed configuration of the input/output devices thereof;

DESCRIPTION OF THE PREFERRED EMBODIMENTS

Figure 1:
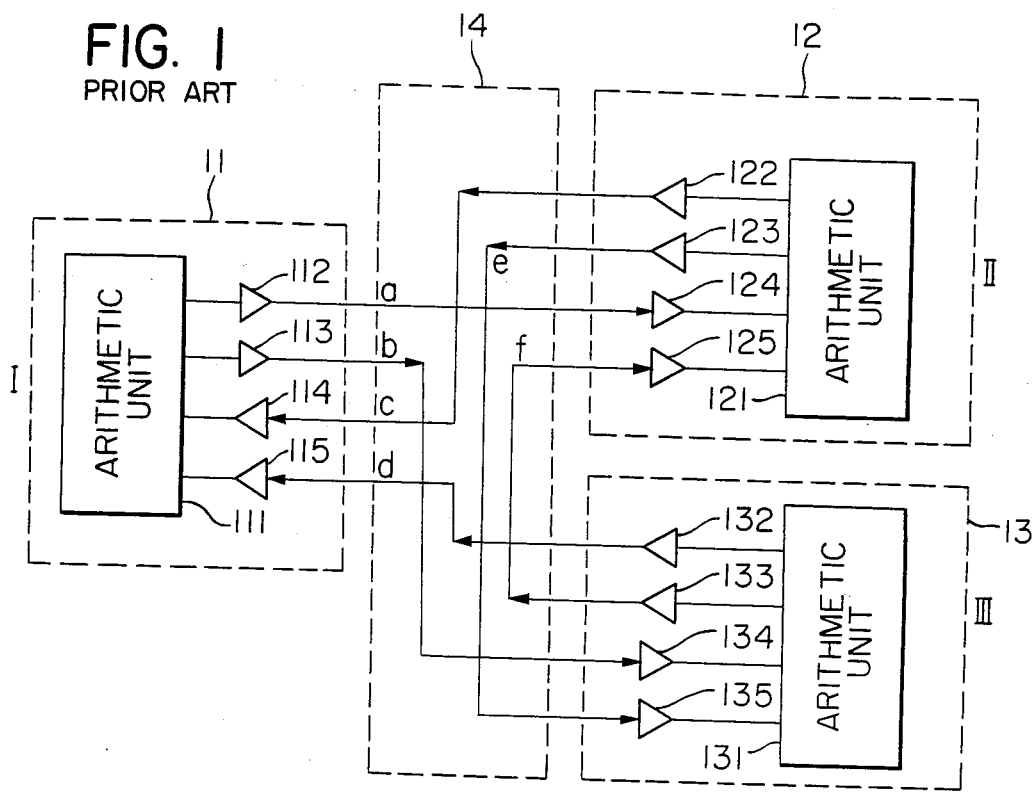
FIG. 1 is a block diagram showing the configuration of signal transmission system of conventional type.
Figure 2A:
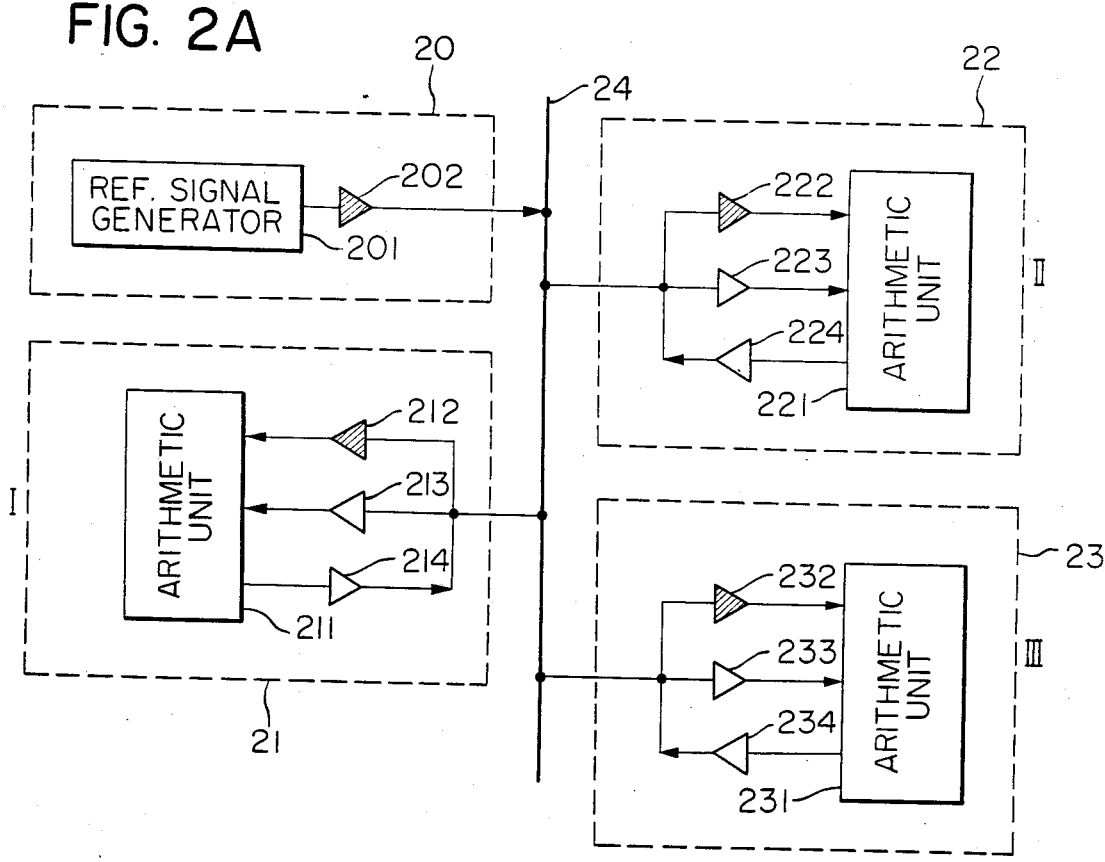
Figure 3A:
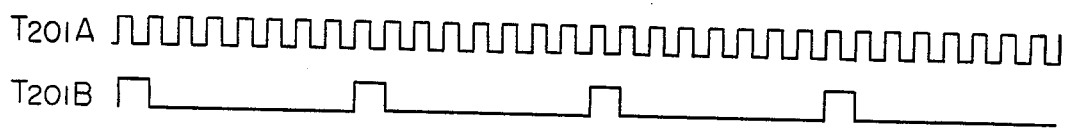
FIGS. 3A, 3B, 3C, and 3D are timing charts showing respectively the state of the operation of each section of the system of the invention.
Figure 3B:
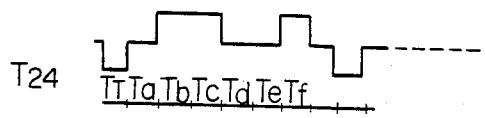
Figure 3C:
Figure 3C:
Figure 3C:
Figure 3C:
Figure 3C:
Figure 3C:
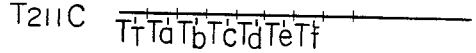
Figure 3C:
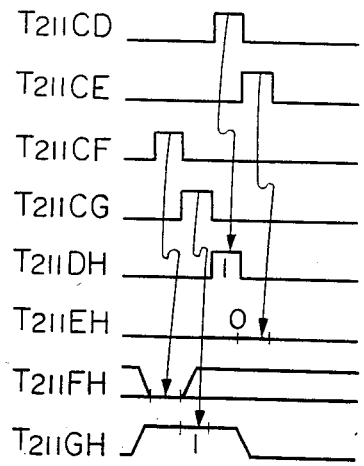

FIGS. 2A, 2B and 2C show examples of the configuration of signal transmission systems according to the present invention. FIGS. 2A, 2B, and 2C show the three devices I, II, and III and FIGS. 3A, 3B, and 3C show examples of timing of signal transmission in the signal transmission system.

FIG. 2A is a block diagram showing the concept of the transmission system of the present invention in which 20 identifies a reference signal source, 21, 22, and 23 identify respectively the devices I, II, and III, and 24 indicates a pair of signal lines which connect the reference signal source 20 with the devices 21 through 23 respectively to perform signal transmission between them. 201 is the reference signal generating source and 202 is the driving section the function of which is to send out the reference signal from the generating source 201 to the pair of signal lines 24.

Further, 211, 221, and 231 are respectively the arithmetic units of the devices I, II, and III, 212, 222, and 232 are respectively the reference signal detecting sections of the devices I, II, and III used to detect the reference signal transmitted through the pair of signal lines 24, 213, 223, and 233 are respectively the input signal detecting sections of the devices I, II, and III which receive the signal transmitted from each device, and 214, 224, and 234 are the output signal driving sections of the devices I, II, and III which send out signals to other devices.

As is clear from the description above, in the signal transmission system of the present invention, transmission and reception of reference signal and individual input/output signals between the devices I, II, and III are carried out by connecting the devices with the reference signal source with only one pair of signal lines 24.

FIG. 2B shows an example of detailed configuration of the above-mentioned reference signal source 20 in which 201A is the oscillator circuit section the oscillated output signal of which is supplied to the reference signal generating section 201B to generate the reference signal used to control the signal lines 24 on a time division basis as described later. The reference signal is sent out to the pair of signal lines 24 by way of the driving section 202.

FIG. 2C shows the detailed configuration of the device I and is exemplary of the devices I, II, and III. Denoted by 212, 213 and 214 are respectively the reference signal detecting sections, input signal detecting section, and output signal driving section. 211A is an oscillator circuit whose oscillation frequency is set to a frequency very close to the oscillation frequency of the reference signal oscillator circuit 201A described above or to an integral number of times thereof. Further, 211B is the counter circuit which receives and counts the number of waves of the oscillation output signal of the oscillator circuit 211A. And the oscillator circuit 211A and the counter-circuit 211B operate in synchronism with the reference signal detected by the reference signal detecting section 212. 211C is the decoder circuit section which operates upon receipt of the counter output signal of the counter circuit 211B and has the function of selecting the using time of the signal lines 24 allotted to the specified device I, or the so-called time slot, from the number of waves counted to the waves of oscillation output from the oscillator circuit 211A which are in synchronism with the reference signals. The time slot signal so selected is supplied to the input signal selecting section 211D and output signal selecting section 211F. The input signal selecting section 211D selects and extracts the signals transmitted to the specified device I from other devices II and III corresponding to the time slot signal coming from the decoder circuit section 211C. The output signal selecting section 211F sends out the signal to be transmitted from the specified device I, and corresponding to the time slot signals coming from the decoder circuit section 211C to other devices II and III via the signal lines 24 by way of the output signal driving section 214. 211H is the arithmetic unit which transmits and receives these input/output signals and performs various arithmetic processings and controls, and 211E is the information source which supplies information carried by the output signals to be sent out to the arithmetic unit 211H from the specified device I. It should be noted here that although the detailed configuration of the device I has been described as an example, the same configuration is of course applicable to the other devices II and III.

Figure 3D:
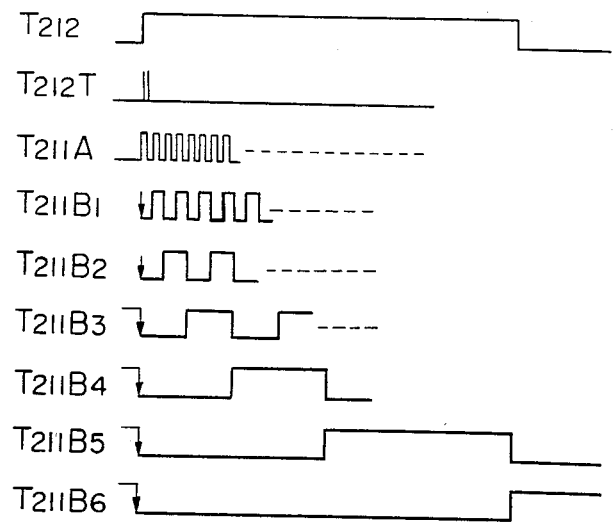

Next, the operation of the signal transmission system of the present invention will be described by referring to the timing charts shown in FIGS. 3A through 3D. FIG. 3A shows the timing of reference signal formation in the reference signal source 20 shown in FIG. 2A, FIG. 3B shows the timing of a signal travelling on the signal line 24 shown in FIG. 2A, FIG. 3C shows as a typical example, the timing of transmission and reception of various signals in the device I, and further FIG. 3D shows the detailed timing of a portion of FIG. 3C described above. (In the interest of clarity, the scale of signals shown in FIG. 3D is larger than that of signals shown in FIG. 3C. That is, the signal T212 is shown in FIG. 3D with a period greatly enlarged from that shown in FIG. 3C. Similarly, the period of signal T211B6 is greatly enlarged from the period of the same signal in FIG. 3C.).

Specifically, in FIG. 3A, T201A is the oscillation output signal of the oscillator circuit section 201A shown in FIG. 2B and T201B is the reference signal generated on the basis of the above-mentioned oscillation output signal, all in the reference signal generating section 201B shown in FIG. 2B. This reference signal T201B is used as the reference for timing allocation for input/output signals of the individual devices in the time-shared use of the signal line 24 and is sent out by the driving section 202 shown in FIG. 2B to the signal line 24 during the period of the reference time slot $T_T$ in the form of a negative polarity signal as shown in FIG. 3B. Accordingly as shown in FIG. 3B, the time slots Ta, Tb, Tc, ... of proper time widths are provided in sequence following the reference time slot $T_T$ and allocated to each of the input/output signals of individual devices.

Next, in FIG. 3C, T212 is the timing signal, which is the negative polarity reference signal on the signal line 24, detected by and extracted from the reference signal detection section 212 of the device I and which is the reference for timing of the various signal processings in the device I. T211A is the signal obtained from the oscillator circuit 211A, the oscillation frequency of which is set to a value very close to an integral multiple of the oscillation frequency of the reference signal oscillation section 201A. In the illustrated embodiment, the frequency of the signal T211A is very close to 32 times the frequency of the signal T201A.

T212T shown in FIG. 3D is the signal obtained from the leading edge of the reference timing signal T212 shown in FIG. 3C by differentiating and shaping the reference timing signal T212. T211B1 through T211B6 in FIG. 3D and T211B6 through T211B8 in FIG. 3C show respectively the output signals from each stage of the counter circuit 211B whose counting input is the oscillation output signal T211A and whose reset input is the leading edge signal T212T. Due to these two input signals, the operation timing of the counter circuit 211B is very close to the timings of the above-mentioned reference oscillation output signal T201A and reference signal T201B. Moreover, in the illustrated example, the counter circuit 211B is established as a 256 frequency dividing counter circuit.

The time slots $T_T'$, Ta', Tb', Tc', ... in T211C shown in FIG. 3C show the reference time slot and the time slots of various signal processings, based on the reference timing mentioned above, in correspondence with the time slots as shown in FIG. 3B, and formed by the decoder circuit section 211C shown in FIG. 2C. Next, T211CD, T211CE, T211CF and T211CG respectively show the timings allocated to signals transmitted from the device II to the device I, from the device III to the device I and from the device I to the device III, which correspond respectively to the above-mentioned time slots Tc', Td', Ta' and Tb', and by these timings delivery of various signals between the device I and the signal line 24 is made. For example, when the positive polarity information transmitting signal on the signal line 24 illustrated in succession to the negative polarity reference signal in FIG. 3B are respectively extracted at timings of T211CD and T211CE, the signals respectively shown by T211DH and T211EH of FIG. 3C are obtained which are available to identify that the information transmitting signals transmitted from the device II and III to the device I are respectively a "1" and a "0". In this way, the information transmitting signal taken into the device I from the signal line 24 is supplied to the arithmetic device 211H to perform various signal processing properly and to pick up information required. When the information to be sent to the devices II and III from the device I are respectively a "0" and "1", the "0" and "1" information transmitting signals are sent out to the signal line 24 by way of sequentially selecting the output signal section 211F and output signal driving section 214 at the timings in above-mentioned T211CF and T211CG by the arithmetic unit 211H as shown respectively in T211FH and T211GH of FIG. 3C.

Although in the preceding descriptions the number of the devices connected to the signal wire 24 was 3 and the number of time slots for using the signal wire 24 on a time division basis was 8 or other. When the number of devices to be connected is increased, the situation can be fully dealt with by increasing the number of time slots, and the above-mentioned modes of signal delivery is made between each device and the signal wire 24 repeatedly for each device. In other words, delivery of information transmitting signals between individual devices is made by way of the single pair of signal wires 24.

In the preceding description it was assumed that there was no delay in the signal transmission by the signal wire 24 between individual devices. In the case when the signal wire 24 in extremely long, a time delay that cannot be be ignored is generated between the time of sending out a signal from each device and the time of receiving the signal at a different device. Therefore, it is advisable to provide a guard band at each time slot in expectation of the delay time of signal transmission.

What I claim is:

1. A signal transmission system for interconnecting a plurality of input/output devices, comprising:
   signal line means for transmitting reference signals and input/output signals;
   reference signal generating means for generating a reference signal, having one frequency, to be applied to said signal line means; and
   a plurality of input/output devices connected to said signal line means, each one comprising:
   detecting means for detecting said reference signal transmitted through said signal line means;
   standard signal generating means for generating a standard signal having a second frequency higher than said one frequency;
   forming means responsive to detection of said reference signal by said detecting means by counting said standard signal, for forming an allowance signal to enable said one input/output device to communicate with another of said input/output devices during a respective using time allotted to said one input/output device;
   process means for processing an input/output signal obtained from said signal line means and an input/output signal to be transmitted through said signal line means;
   input signal selector means for receiving an input/output signal from said signal line means and said allowance signal from said forming means and for introducing an input/output signal corresponding in time to said allowance signal into said process means from said signal line means; and
   output signal selector means for receiving an input/output signal obtained from said process means and said allowance signal and for transmitting an input/output signal from said process means to said signal line means.

2. A signal transmission system as set forth in claim 1, wherein said allowance signal forming means comprises a counter and a decoder.

3. A signal transmission system as set forth in claim 1, wherein said process means comprises an arithmetic unit.

4. A signal transmission system for interconnecting a plurality of input/output devices, comprising:
   signal line means for transmitting a signal having one standard level and signals having a first level and a second level each different from said standard level;
   reference signal generating means for applying a reference signal, having one frequency and having said first level out of said three levels to said signal line means; and
   a plurality of input/output devices connected to said signal line means, each one comprising:
   detecting means for detecting said reference signal transmitted through said signal line means;
   standard signal generating means for generating a standard signal having a second frequency higher than said one frequency;
   forming means responsive to detection of a reference signal by said detecting means by counting said standard signal, for forming an allowance signal to enable said one input/output device to communicate with another of said input/output devices during a respective using time allotted to said one input/output device; and
   signal transmitting means responsive to said allowance signal for transmitting a signal having said second level to said signal line means.

5. A signal transmission system as set forth in claim 4, wherein said allowance signal forming means comprises a counter and decoder.

* * * * *

UNITED STATES PATENT AND TRADEMARK OFFICE
CERTIFICATE OF CORRECTION

PATENT NO. : 4,569,047

DATED : February 4, 1986

INVENTOR(S) : HARUTSUGU AIMURA

It is certified that error appears in the above-identified patent and that said Letters Patent is hereby corrected as shown below:

Column 1, line 20, change "signals which" to --signals, which--;
line 21, change "signals are" to --signals, are--;
line 30, change "disadvantage, that" to --disadvantage that--;
line 33, change "and the the reliability" to --and the reliability--;
line 58, change "f two" to --f, two--; and
line 59, change "devices namely" to --devices, namely--.

Column 3, line 22, change "counter-circuit 211B" to --counter circuit 211B--; and
line 41, change "211C to" to --211C, to--.

Column 5, line 17, change "other. When" to --other, when--;
line 29, change "24 in" to --24 is--; and
line 30, change "cannot be be ignored" to --cannot be ignored--.

UNITED STATES PATENT AND TRADEMARK OFFICE
CERTIFICATE OF CORRECTION

PATENT NO. : 4,569,047

DATED : February 4, 1986

INVENTOR(S) : Harutsugu Aimura

It is certified that error appears in the above-identified patent and that said Letters Patent is hereby corrected as shown below:

Column 6, line 53, change "and decoder." to -- and a decoder. --.

Signed and Sealed this

Twelfth Day of August 1986

[SEAL]

Attest:

DONALD J. QUIGG

Attesting Officer

Commissioner of Patents and Trademarks